Aug. 24, 1965  J. P. RUCH  3,202,754
COMBINED DUCT AND ELECTRIC CABLE
Filed March 7, 1962  2 Sheets-Sheet 1
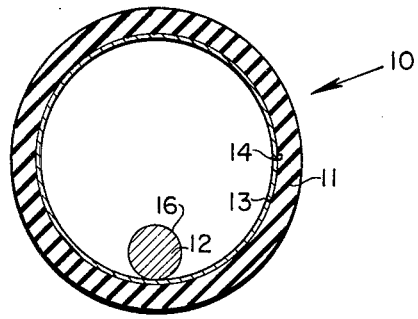
Fig. 1
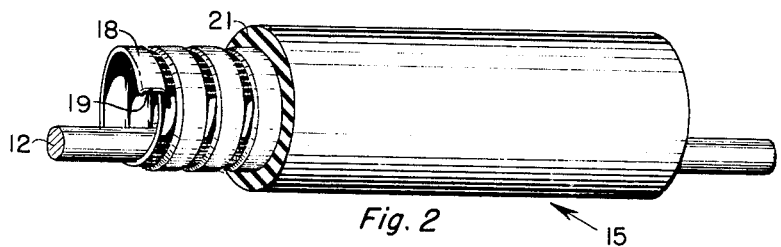
Fig. 2
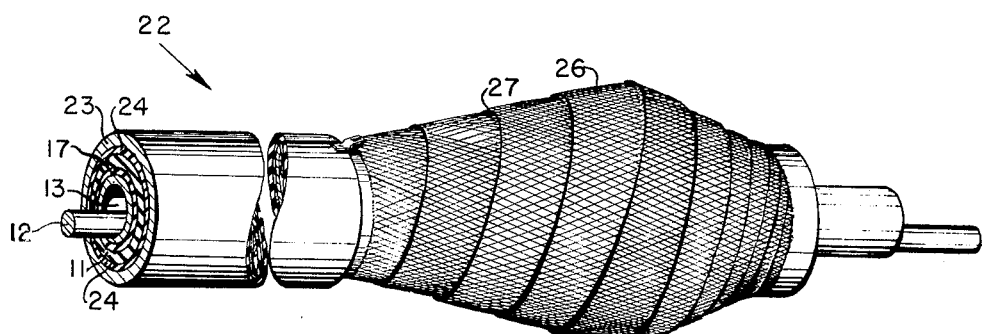
Fig. 3
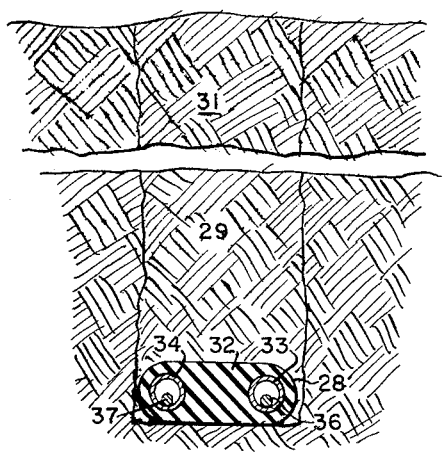
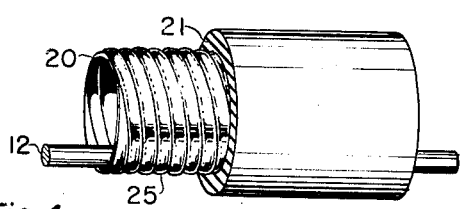
Fig. 4   Fig. 6
INVENTOR.
JAMES P. RUCH
HIS AGENT Aug. 24, 1965    J. P. RUCH    3,202,754
COMBINED DUCT AND ELECTRIC CABLE
Filed March 7, 1962    2 Sheets-Sheet 2

INVENTOR.
JAMES P. RUCH
U.F. Volk
HIS AGENT

United States Patent Office 3,202,754
Patented Aug. 24, 1965

3,202,754
COMBINED DUCT AND ELECTRIC CABLE
James P. Ruch, Orange, Calif., assignor, by mesne assignments, to Anaconda Wire and Cable Company, a corporation of Delaware
Filed Mar. 7, 1962, Ser. No. 178,049
12 Claims. (Cl. 174—68)

My invention relates to electrical systems and particularly to distribution systems for electric power.

In the transmission of electric power it is customary to convey the electrical energy by means of copper or aluminum conductors from a point of generation to a point or a plurality of points of utilization. For large blocks of power at least two conductors are required between the points of generation and utilization but most commonly 3-conductor systems are employed for A.-C. distribution and 4-conductor systems are also known.

Broadly speaking, two basic means have, up to now, been employed for distributing electrical power; these are systems where the conductors are widely spaced and the air between them serves as primary insulation, and systems in which the conductors are factory insulated with a dielectric material such as oil-saturated paper, rubber, polyethylene, polyvinyl chloride, etc. Limitation of the first-named system has been the large amount of space required for insulation between conductors at high voltages and for protection from accidental contact. Limitation of the second system wherein the conductors are factory insulated and shipped to the utilization site on cable reels, is the high cost of replacement since not only must the conductor be replaced but the insulation also, whenever an increase in load requirements dictates the need for a larger conductor. Where cables have been buried the cost of replacement is increased greatly by the high labor costs involved in digging up the old cable and laying a larger one. Additionally it is necessary in the case of factory insulated cables for the installation crew to remove the insulation at terminations and joints. This has to be done under field conditions where labor is expensive and it is difficult to install proper jigs or fixtures, with the result that the conductors are frequently cut or damaged.

Where there are a plurality of points of utilization of electrical energy at a common voltage it is general practice to employ a single large-size feeder cable and to tap into this feeder at different points along its length with smaller cables leading to the individual points of utilizing. In fact it is not uncommon for the smaller cables themselves to be tapped by even smaller leads or branch circuits. At each tap it is necessary to pierce the insulation of the larger cable, to remove the insulation from a length of the end of the conductor of the smaller cable, and to make a connection by means of a suitable clamp between the conductors of the two cables. The connections, so made, have always been potential sources of trouble because of the possibility of making poor electrical contact between the surfaces of the conductors.

I have overcome the objections to both of the aforementioned electric power transmission systems by means of an insulated conduit system into which bare conductors can be pulled as required. In the case of branch circuits my invention makes it possible to run unspliced conductors from a single source to a plurality of utilization points. For my system I have invented a replaceable-conductor cable comprising an elongated conductor having an outer surface or periphery, a tubular wall of electrical insulation having an inner surface or periphery and surrounding the conductor, and an electrically conducting liner intimately covering the inner periphery of the insulation. The liner is in electrical contact with the conductor and has the same electrical potential and frequency, and the inner periphery of the insulation is substantially greater than the outer periphery of the conductor with the conductor loosely deposited within the tubular wall whereby it can be pulled lengthwise and at least one additional conductor can be pulled lengthwise into the tubular insulation. At high voltages my cable has an electrically conducting shield at ground potential intimately covering the outer surface of the insulation. The liner may take the form of a conduit so that I have invented a conduit system comprising a conductor receiving conduit which may be comprised of helical turns of metallic strip and has an electrically conducting inner periphery and a wall of electrical insulation sufficient for the voltage on the conductor surrounding the conduit. Where the voltage is high enough to warrant it, a shield is provided over my conduit insulation and at terminations stress relief cones are provided between the insulation and shield.

I have invented a method of installing a buried cable system comprising the steps of cutting a trench, laying an insulated conduit having electrical insulation sufficient for the voltage of the system in the trench, refilling the trench over the conduit, and pulling bare or uninsulated conductors comprising the current carrying elements of my system into the conduit. I have also invented a method of installing a power transmission system in a building comprising installing a plurality of conduits equal to the number of phases in the system in the building with the conduits electrically insulated sufficiently for the electrical voltage of the system, and pulling bare conductors into the conduits.

It will be understood that although the liners or conduits of my cables are capable of carrying current they are not used for the transmission of load current but serve only as electrical shielding in the sense that they are not directly connected to the load. All the power is transmitted by means of the conductors within the liners since these, only, are connected to the load. It is, of course, inevitable that, in a long cable some of the current will be distributed to the conduit or liner, such a result, however, is merely incidental to its shielding action.

A more thorough understanding of my invention can be gained by reference to the appended drawing.

In the drawing:

FIGURE 1 is a sectional view illustrating an embodiment of my invention.

FIGURE 2 is a sectionalized perspective view illustrating another embodiment of my invention.

FIGURE 3 is a sectionalized perspective view illustrating still another embodiment of my invention.

FIGURE 4 is a perspective view of a buried cable system made to my invention.

FIGURE 6 is a sectionalized perspective view of another embodiment of my invention.

Figure 5:
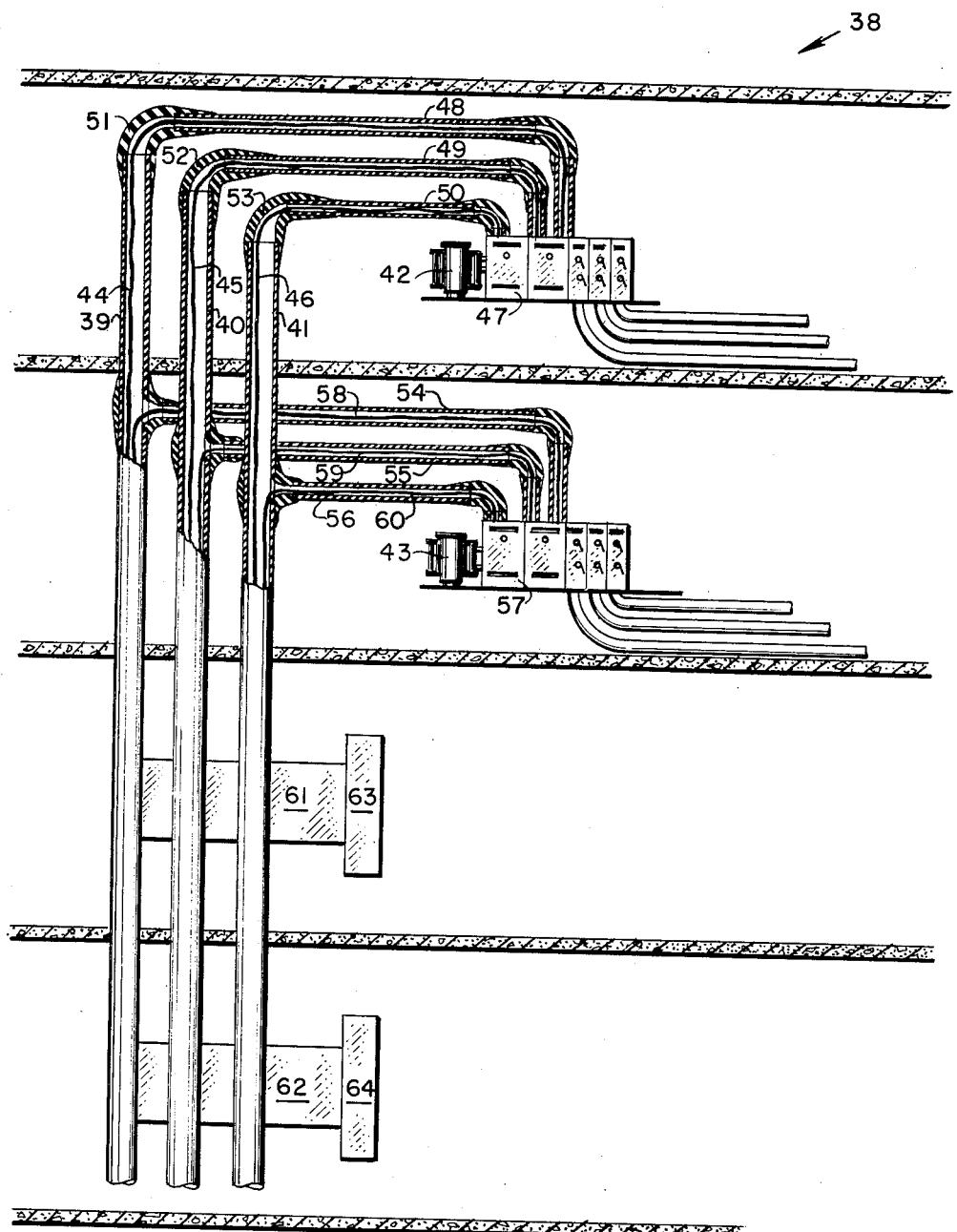
FIGURE 5 is a schematic view of an electrical transmission system installed in a building according to my invention.

In FIGURE 1 I have shown a section of a cable 10 comprised of a tubular insulation 11 and a metal conductor 12. For ease and economy of manufacture the insulation 11 is preferably an extrudable, high dielectric plastic such as polyethylene. A liner 13 of conducting material covers the inner periphery or surface 14 of the insulation 11. The conductor 12 will conveniently be circular in section but is not limited to this shape and has an outer surface or periphery 16 smaller than the inner periphery 14 of the insulation leaving room for additional conductors where such are required. Because of the large size of the insulation 11 compared to the conductor 12 it is relatively easy to pull long lengths of conductor into the insulation. Instead of pulling additional conductors into the insulation it is also a very simple matter to withdraw the conductor 12 by pulling it lengthwise from the cable and to pull in a larger conductor. The liner 13 is in continuous contact with the conductor 12 and is therefore at the same electrical potential and frequency as the conductor. Consequently there is no tendency for electrical arcs to form between the conductor 12 and the surface 14. Where the insulating tube 11 is extruded polyethylene the liner 13 may also be made of polyethylene but with the addition of a conducting material such as carbon black to make it conduct electricity. A structure comprising the insulation 11 and liner 13 may thus be conveniently produced in a dual extrusion process in a single operation. Cable thus produced will have an intimate bond at the surface 14 between the liner 13 and the insulation 11.

In another embodiment the liner 13 may be a thin-walled tubing such as aluminum or copper tubing and have a wall of insulation such as polyethylene extruded over it. In this case it may be desirable to have an intervening layer 17 (FIGURE 3) of a conducting material such as that described in Patent 2,913,515 to D'Ascoli that will make intimate contact with the polyethylene surface between the liner 13 and the insulation 11.

It has long been known to enclose cables in conduits but such cables have been insulated inside of the conduit while the conduit itself has not been electrically insulated. In some cases known conduits have been covered with materials designed to protect them from corrosion and other environmental factors but any electrical insulation afforded by such known coverings has been incidental and was not relied upon to electrically isolate the current carrying element of the cable.

It is a novel feature of my invention that, instead of insulating the conductor I have, in effect, insulated the conduit while leaving the conductor bare. My insulation 11 is always sufficient in dielectric strength to electrically insulate my cable for the intended applied voltage. It is conceivable that some sort of covering might be applied over the conductor 12 of my cable as a means, perhaps, of protecting it from gouging during the pulling operation or as a phase identification. Such covering, however, is never sufficient to provide electrical insulation at the desired voltages and, indeed, any dielectric covering on the conductor 12 is undesirable since it would permit the establishment of a voltage difference between points on the surface 16 of the conductor and points on the conducting layer 13.

Where extreme flexibility is desired my cable, as in the embodiment indicated generally by the numeral 15 of FIGURE 2, may employ a conduit 18 made up of spiral turns of a metal strip 19 and an outer wall of insulation 21 preferably of a soft, flexible material such as rubber. Alternatively my cable may have a conduit 20 as shown in FIGURE 6 which is comprised of a metal tube rendered flexible by means of circumferential corrugations 25. In the manufacture of the cables 10 and 15 the conductor 12 may economically be introduced during the manufacturing operation. On the other hand the cables may be advantageously made and stocked without the conductors and the latter pulled in at the installation site. This last named procedure permits large runs of cables to be made at one time without regard to the particular conductor sizes required.

In FIGURE 3 I have shown a shielded cable, indicated by the numeral 22. Shielded cables are usually indicated where the voltage is above a certain minimum such as 2,000 or 5,000 volts. However, since my cable may be expected to serve as a permanent installation during a succession of changes in conductor size it may be considered advisable to apply an outer shielding at voltages lower than those at which shieldings are usually applied. In the case of the cable 22 the outer shielding is an extruded lead sheath 23 and it is applied over a conducting layer 24. The layer 24 may be an outer extrusion of carbon-black-filled polyethylene similar to the extrusion 13 and it may be applied in a triple extrusion operation along with the insulation 11 and the liner 13. In some cases the extrusion 24 may offer sufficient external shielding so that the outer metallic shield 23 may be omitted. And instead of extruded lead the shield 23 may consist of aluminum or of bronze or other suitable metal tapes or metallic braids. Many means are known for shielding electric cables and I do not wish to be limited to any in particular of such means.

At a termination in my cable 22 I have provided a stress relief cone 26 having an outer conducting surface 27 electrically connected to the conducting layers 24 and 23. The cone 26 need not differ essentially from stress cones used on conventional types of cable but my invention permits a much greater economical use of prefabricated stress relief cones. This comes about as follows: Cables of the types indicated by the numerals 10, 15, 22 can be standardized at a single size since the size is independent of the size of the conductors. It then becomes commercially possible to mass produce molded stress cones for the standard size of cable whereas conventional cables vary in size for each conductor with the result that the stress cones are almost always custom made and are usually applied in the field by repeated wrapping of dielectric tapes to the desired contour.

The advantages of my invention are particularly evident in the case of buried cable. In recent years the cost of burying cables has been materially reduced by the practice of using cable plows to dig a trench, lay a cable therein, and then refill the trench in a single operation. Full utilization of this economical method of installing cable has not been feasible, however, because of the high cost of removing a conventional buried cable to replace it with a larger size when increased electrical loads are encountered. In FIGURE 4 I have shown a 2-conductor parallel cable 28 made in accordance with my invention, buried in a trench 29 and covered with refill 31. The cable 28 has an integral body of insulation 32 sufficient for the voltage to be applied to said cable. Two conducting liners 33, 34 are embedded in the insulation, one for each of the two phases of the cable. It will be understood that although I have shown an integrally insulated 2-conductor buried cable 28 my invention is not limited thereto and will have advantages for buried cables with conductors other than two and with non-integral insulations. Inside of the liners 33, 34 respective bare conductors 36, 37 have diameters considerably smaller than the inner diameters of the liners. When increased loads demand greater conductor areas it is not necessary to dig up the cable 28 but merely to pull in an additional bare conductor parallel to each of the existing conductors 36, 37. Alternatively the ends of the conductors 36, 37 may be connected to conductors of larger diameter and the latter pulled into the cable by means of withdrawing the conductors 36, 37.

Referring now to FIGURE 5 a building, indicated generally by the numeral 38 has three cables in the form of insulated conduits 39, 40, 41 in vertical arrangement for transmission of 3-phase power through the building 38. Each of the cables 39, 40, 41 is shielded with a shielding 23 (FIGURE 3) and the insulation is sufficient for a high voltage, which is reduced on individual floors of the building by transformers 42, 43. Conductors 44, 45, 46 are connected through appropriate fusing means housed in a housing 47. The housing 47 is connected to the main cables 39, 40, 41 by short insulated conduits 48, 49, 50. In connecting the cables 48, 49, 50 to the respective vertical cables 39, 40, 41 use is made of respective stress relief cones 51, 52, 53. To feed the transformer 43 on the floor below the transformer 42, short cables consisting of insulated conduits 54, 55, 56 tap respectively into the cables 39, 40, 41. The cables 54, 55, 56 feed into a fuse box 57. The conductors 44, 45, 46 lead into the fuse box 47 but not into the box 57. For the purpose of supplying the load from the transformer 43 conductors 58, 59, 60 lead from the fuse box 57, through the cables 54, 55, 56 and down the cables 39, 40, 41. The cables 39, 40, 41 are installed with taps such as taps 61, 62 on each floor leading to terminal boxes such as boxes 63, 64. Should it be desired to make use of the cables 39, 40, 41 to supply power to equipment newly installed on the floor serviced by the tap 61, it is not necessary to bring new cables into the building or to splice into the conductors of existing cables but merely to pull conductors, of the dimensions required by the load, up through the conduits 39, 40, 41, tap 61, through the terminal box 63. Since only bare conductors are pulled the power in the system need only be shut down for a minimum of time.

I have invented new and useful articles and methods for which I desire an award of Letters Patent.

I claim:
1. A replaceable-conductor electric power cable comprising:
   (A) an elongated conductor
      (a) energized at a selected voltage and frequency
      (b) said frequency being selected from the group consisting of alternating current power frequencies and direct current,
   (B) a tubular wall of electrical insulation
      (a) having an inner periphery
      (b) surrounding said conductor and
      (c) adequate to insulate said conductor from ground at said voltage,
   (C) an electrically conducting liner covering said inner periphery
   (D) said liner being in electrical contact with said conductor and having the same voltage and frequency as said conductor,
   (E) said liner defining a sectional area at least twice the sectional area of said conductor, thereby permitting another such conductor to be pulled into said cable, and
   (F) air at atmospheric pressure being in contact with said elongated conductor and said liner within said cable.

2. The cable of claim 1 wherein said liner is comprised of helical turns of metallic strip.

3. The cable of claim 1 wherein said liner is a corrugated metallic tube.

4. The cable of claim 1 wherein said liner is a conducting plastic extrusion.

5. A replaceable-conductor electric power cable comprising:
   (A) an elongated conductor
      (a) energized at a selected voltage and frequency
      (b) said frequency being selected from the group consisting of alternating current power frequencies and direct current,
   (B) a tubular wall of electrical insulation
      (a) having an inner periphery
      (b) surrounding said conductor and
      (c) adequate to insulate said conductor from ground at said voltage,
   (C) an electrically conducting liner covering said inner periphery,
   (D) said liner being in electrical contact with said conductor and having the same voltage and frequency as said conductor,
   (E) said liner being sufficiently spaced from said conductor to permit another such conductor to be pulled into said cable,
   (F) air at atmospheric pressure being in contact with said elongated conductor and said liner within said cable, and
   (G) an electrically conducting shield at ground potential covering the outer surface of said wall of insulation.

6. The cable of claim 5 wherein said liner is comprised of helical turns of metallic strip.

7. The cable of claim 5 wherein said liner is a corrugated metallic tube.

8. The cable of claim 5 wherein said liner is a conducting plastic extrusion.

9. A multiphase electric cable system comprising:
   (A) a plurality of elongated conductors
      (a) corresponding, in number, to the phases of said system,
      (b) energized at a selected voltage and frequency,
      (c) said frequency being an alternating current power frequency,
   (B) a like plurality of tubular walls of electrical insulation
      (a) each separately surrounding one of said conductors,
      (b) said tubular walls each having an inner periphery, and
      (c) said walls being adequate to insulate said conductors from each other and from ground at said voltage,
   (C) electrically conducting liners covering the inner periphery of each of said tubular walls,
   (D) each of said liners being in electrical contact with, and having the same instantaneous voltage as one of said conductors,
   (E) each of said liners defining a sectional area at least twice the sectional area of its contacting conductor, thereby permitting another such conductor to be pulled in adjacent to said contacting conductor, and
   (F) air at atmospheric pressure being in contact with said said conductors and said liners within said tubular walls of insulation.

10. The cable system of claim 9 wherein said liners are comprised of helical turns of metallic strip.

11. The cable system of claim 9 wherein said liners are corrugated metallic tubes.

12. The cable system of claim 9 wherein said liners are conducting plastic extrusions.

References Cited by the Examiner

UNITED STATES PATENTS

| 2,004,589 | 6/35 | Smedley | 174—68 |
| 2,165,738 | 7/39 | Van Hoffen | 174—102 |
| 2,304,210 | 12/42 | Scot et al. | 333—96 X |
| 2,396,283 | 3/46 | Papst | 174—73 X |
| 2,438,146 | 3/48 | Candee et al. | 174—68 |
| 2,476,953 | 7/49 | Bennett | 61—72.1 |
| 2,690,469 | 9/54 | Perls | 174—106 |

FOREIGN PATENTS

| 989,945 | 5/51 | France. |
| 1,088,124 | 9/60 | Germany. |
| 572,339 | 10/45 | Great Britain. |
| 828,253 | 2/60 | Great Britain. |

DARRELL L. CLAY, *Acting Primary Examiner.*

JOHN P. WILDMAN, LARAMIE E. ASKIN, *Examiners.*

UNITED STATES PATENT OFFICE
CERTIFICATE OF CORRECTION

Patent No. 3,202,754　　　　　　　　　　　　　　　　August 24, 1965

James P. Ruch

It is hereby certified that error appears in the above numbered patent requiring correction and that the said Letters Patent should read as corrected below.

Column 1, line 49, for "utilizing" read -- utilization --; column 4, line 42, for "understod" read -- understood --; column 5, lines 65 and 66, strike out "being sufficiently spaced from said conductor to permit" and insert instead -- defining a sectional area at least twice the sectional area of said conductor, thereby permitting --; column 6, line 16, after "system" strike out the comma; line 40, strike out "said", first occurrence.

Signed and sealed this 8th day of March 1966.

(SEAL)

Attest:

ERNEST W. SWIDER　　　　　　　　　　　　　　EDWARD J. BRENNER
Attesting Officer　　　　　　　　　　　　　　　Commissioner of Patents